United States Patent
Nakamura et al.

(10) Patent No.: US 12,043,566 B2
(45) Date of Patent: Jul. 23, 2024

(54) GLASS FIBER AND METHOD FOR PRODUCING THE SAME

(71) Applicant: Nippon Sheet Glass Company, Limited, Tokyo (JP)

(72) Inventors: Aya Nakamura, Tokyo (JP); Hidetoshi Fukuchi, Mie (JP); Masanori Shojiya, Hyogo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 901 days.

(21) Appl. No.: 17/045,884

(22) PCT Filed: Sep. 28, 2018

(86) PCT No.: PCT/JP2018/036571
§ 371 (c)(1),
(2) Date: Oct. 7, 2020

(87) PCT Pub. No.: WO2019/198258
PCT Pub. Date: Oct. 17, 2019

(65) Prior Publication Data
US 2021/0139368 A1  May 13, 2021

(30) Foreign Application Priority Data
Apr. 9, 2018 (JP) .................. 2018-075003

(51) Int. Cl.
*C03C 13/00* (2006.01)
*C03B 37/01* (2006.01)

(52) U.S. Cl.
CPC ............ *C03C 13/00* (2013.01); *C03B 37/011* (2013.01); *C03C 2213/00* (2013.01)

(58) Field of Classification Search
None
See application file for complete search history.

(56) References Cited

U.S. PATENT DOCUMENTS

| | | |
|---|---|---|
| 5,576,253 A | 11/1996 | Osafune et al. |
| 2005/0096209 A1 | 5/2005 | Kase et al. |
| 2016/0368815 A1 | 12/2016 | Hayashi et al. |

FOREIGN PATENT DOCUMENTS

| | | |
|---|---|---|
| JP | H07109149 | 4/1995 |
| JP | H107157975 | 6/1995 |
| JP | 2011011969 | 1/2011 |
| JP | 2011068549 | 4/2011 |
| JP | 2014088306 | 5/2014 |
| JP | 2015024946 | 2/2015 |
| JP | 2017105657 | 6/2017 |

OTHER PUBLICATIONS

Machine translation of JP 2011068549. (Year: 2011).*
Extended European Search Report issued for European Patent Application No. 18914050.2, dated Nov. 29, 2021, 8 pages.
International Search Report and Written Opinion issued for International Patent Application No. PCT/JP2018/036571, Date of mailing: Dec. 11, 2018, 9 pages including English translation of Search Report.

* cited by examiner

Primary Examiner — Elizabeth A. Bolden
(74) Attorney, Agent, or Firm — HSML P.C.

(57) ABSTRACT

A glass fiber according to the present invention is suitable for preventing filament breakage and suitable for being stably produced for a long term, and has a ß-OH value of 0.02 $mm^{-1}$ or more and less than 0.55 $mm^{-1}$. The preferred content of $SO_3$ is more than 0 ppm and 70 ppm or less on a mass basis. The glass fiber is preferably substantially free of As and Sb. $SO_3$ can be supplied to a glass raw material as, for example, a sulfuric acid salt of an alkali metal or an alkaline-earth metal.

30 Claims, No Drawings

GLASS FIBER AND METHOD FOR PRODUCING THE SAME

TECHNICAL FIELD

The present invention relates to a glass fiber. The glass fiber according to the present invention can be obtained by a production method including the steps of; making a glass melt from a glass raw material; and forming a glass fiber from the glass melt.

BACKGROUND ART

A glass fiber is formed from a glass melt using a shaping equipment called a bushing. A bushing has a lot of nozzles (which are also called tips) at its bottom, and at least a portion of the bushing, the portion having contact with a glass melt, is formed of a noble metal such as platinum or a platinum alloy. The glass melt is discharged in the form of a lot of filaments through the bushing out of a melting furnace. A sizing agent is applied to the filaments, which are bundled into one strand or a plurality of strands and wound.

Accidental breakage of a filament hinders stable production of a glass fiber. For example, a foreign matter such as a devitrified material in a glass melt and change in a meniscus which a glass melt discharged from a nozzle forms near the nozzle are known to be involved in filament breakage. However, the cause of filament breakage has not been fully revealed yet. As it is unrealistic to completely prevent incidental filament breakage, production techniques based on the assumption of filament breakage have also been proposed. One example thereof is a technique (Patent Literature 1) for promptly detecting filament breakage by image processing.

In the technical field of glass fibers, bubbles have been treated as a factor in forming of a hollow fiber. Small-diameter bubbles remaining in a glass melt are stretched in the direction of discharging the glass melt and are left in the stretched state in the resulting glass fiber to decrease the strength and other properties of the glass fiber.

Patent Literature 2 discloses a glass fiber in which the content of $SO_3$ is 50 ppm or less on a mass basis to prevent formation of a hollow fiber. $SO_3$ in the glass fiber is derived from a sulfuric acid salt intentionally added as a refining agent to a glass raw material or included in a small amount as impurities. Patent Literature 2 points out that too high a content of $SO_3$ increases the number of bubbles remaining in a glass melt and serving as a factor in forming of a hollow fiber.

Patent Literature 2 also discloses that the ß-OH value should be controlled to 0.55 to 0.65 $mm^{-1}$. The ß-OH value is a measure of the water content in glass. In Patent Literature 2, the viscosity of a glass melt is decreased by maintaining the ß-OH value at 0.55 $mm^{-1}$ or more, which promotes refining of the glass melt and prevents formation of a hollow fiber.

CITATION LIST

Patent Literature

Patent Literature 1: JP 2017-105657 A
Patent Literature 2: JP 2011-68549 A

SUMMARY OF INVENTION

Technical Problem

Occurrence of filament breakage needs to be prevented as much as possible in order to achieve stable production of a glass fiber. The present invention aims to provide a glass fiber suitable for being stably produced without filament breakage.

Solution to Problem

As a result of intensive studies, the present inventors have found that controlling the ß-OH value in a certain range can result in a decrease in frequency of filament breakage.

The present invention provides a glass fiber having a ß-OH value of 0.3 $mm^{-1}$ or more and less than 0.55 $mm^{-1}$.

Advantageous Effects of Invention

The glass fiber according to the present invention is suitable for being mass-produced by a stable, long-term continuous operation.

DESCRIPTION OF EMBODIMENTS

Hereinafter, the present invention will be described in detail. The following description is not intended to limit the present invention to specific embodiments. The sign "%" used hereinafter to indicate the contents of various glass components refers to "mass %", and "ppm" used hereinafter refers to the contents of various components on a mass basis. Being "substantially free of" a component means that the content of the component is less than 0.1 mass %, preferably less than 0.08 mass %, and more preferably less than 0.05 mass %.

[ß-OH]

A study by the present inventors has revealed that generation of oxygen gas by reboiling of a glass melt on contact with a bushing is one of the causes of filament breakage. An OH group in a glass melt is reduced by contact with a noble metal, such as platinum, forming a bushing, and thus hydrogen gas ($H_2$) is generated. Since hydrogen gas can pass through the barrier of a noble metal, a portion of the generated hydrogen gas is emitted out of a furnace. Consequently, oxygen gas ($O_2$) is generated from excessive oxygen atoms remaining in the glass melt. This results in formation of new bubbles in the glass melt or growth of tiny bubbles of, for example, $SO_2$ contained in the glass melt.

In Patent Literature 2, the ß-OH value is adjusted to 0.55 $mm^{-1}$ or more to decrease the viscosity of a glass melt for the purpose of removing such tiny bubbles and thus reducing formation of a hollow fiber. In view of reducing reboiling, however, it is appropriate to limit the ß-OH value which is a measure of the water content in glass to a lower level. The ß-OH value of the glass fiber according to the present invention is required to be adjusted specifically to less than 0.55 $mm^{-1}$. A preferred ß-OH value is 0.53 $mm^{-1}$ or less, even less than 0.5 $mm^{-1}$, or particularly less than 0.48 $mm^{-1}$.

Too low a ß-OH value sometimes makes it difficult to refine a glass melt. Therefore, a preferred ß-OH value is 0.1 $mm^{-1}$ or more, 0.3 $mm^{-1}$ or more, even 0.35 $mm^{-1}$ or more, or particularly 0.4 $mm^{-1}$ or more.

The ß-OH value can be controlled by adjusting, for example, the water content in a glass raw material and the water content in the atmosphere of a furnace where the glass raw material is molten. The ß-OH value of a glass fiber obtained by application of common production conditions is beyond the above preferred range. Therefore, it is recommended to decrease the ß-OH value, for example, by i) selecting a glass raw material having a low moisture content, ii) performing a preliminary treatment for drying the glass raw material, and iii) blowing an inert gas such as nitrogen gas into a glass melt.

[$SO_3$]

$SO_3$ in the glass fiber is derived from a sulfuric acid salt in a glass raw material or a sulfur component in fuel used for melting. The sulfuric acid salt is a refining agent for generating $SO_2$ bubbles in a glass melt. As is conventionally known, $SO_2$ bubbles themselves can be a factor in forming a hollow fiber; but $SO_2$ bubbles are unlikely to be the only direct cause of filament breakage. In fact, experiences of the present inventors indicate that a filament having a glass composition in which the content of $SO_3$ is relatively low can be more frequently broken than a filament having a glass composition in which the content of $SO_3$ is relatively high.

However, $SO_2$ bubbles included in the glass melt can affect the likelihood of occurrence of filament breakage. Therefore, the content of $SO_3$ remaining in the glass fiber is preferably 75 ppm or less, more preferably 70 ppm or less, and particularly preferably 68 ppm or less. In order to obtain the refining effect of the sulfuric acid salt, the content of $SO_3$ is preferably set to more than 0 ppm. It is more preferable that the content of $SO_3$ be 5 ppm or more, 20 ppm or more, even 25 ppm or more, or particularly 30 ppm or more. The content of $SO_3$ may be more than 50 ppm, for example, 55 ppm or more or even 60 ppm or more.

[As and Sb]

The use of As and Sb oxides which are environmentally-unfriendly refining agents is desirably avoided in production of the glass fiber, as in production of other glass products. In a preferred embodiment of the present invention, the glass fiber is substantially free of As and Sb. In this case, it is preferred that the content of $SO_3$ in the glass fiber be more than 0 ppm, for example, more than 0 ppm and 75 ppm or less or more specifically 20 to 75 ppm in order to obtain the refining effect of the sulfuric acid salt

[Diameter of Glass Fiber]

The glass fiber according to the present invention can have a diameter of 15 μm or less, even 10 μm or less, or particularly 5 μm or less. The present invention is particularly suitably applied to a glass fiber having such a small diameter that it is relatively difficult to stably and continuously produce the glass fiber. When the glass fiber has a smaller diameter, the use of a bundle of a number of the glass fibers as a strand included in a rubber-reinforcing cord makes the strand relatively flexible and bendy. Consequently, the glass fiber having a smaller diameter can improve the bending strength of the cord. Moreover, the cord can have a reduced cross-section area compared to a cord having the same strength. The lower limit of the diameter of the glass fiber is, for example, but not particularly limited to, 2 μm, or may be 3 μm. It should be noted that the glass fiber according to the present invention is applicable to a glass fiber having as large a fiber diameter as more than 15 μm or even 20 μm or more.

A variation in diameter of the glass fiber according to the present invention can be ±3 μm or less or even ±2 μm or less. The present invention is also suitable for reducing the variation in diameter of the glass fiber. A glass fiber having a greatly varying and non-constant diameter is likely to be stressed because of its wavy outer shape, resulting in a decrease in bending strength. Therefore, the variation in diameter of the glass fiber is desirably small. Herein, the diameter of the glass fiber is measured at any 50 points, and a difference (expressed with +) between the simple average and largest value of the resulting values and a difference (expressed with −) between the simple average and smallest value of the resulting values are determined as the variation in diameter of the glass fiber. The diameter of the glass fiber can be determined by simple averaging as described above.

[Length of Glass Fiber]

The length of the glass fiber according to the present invention is not particularly limited, and is, for example, 2 m or more and preferably 5 km or more in view of productivity.

[Roundness of Glass Fiber]

The cross-section of the glass fiber according to the present invention is, for example, an approximate circle, and the roundness thereof can be 0.7 or more. Herein, the roundness is a value defined as $(4\pi S/L^2)$, where the cross-section area of the glass fiber is S and the length of the perimeter of the cross-section of the glass fiber is L. A cross-section having a roundness of 1 is a perfect circle. Specifically, the roundness of the glass fiber can be measured using a scanning electron microscope. For the measurement, image processing software, for example, Image J by Wayne Rasband is conveniently used.

Preferred Embodiments

Controlling the content of $SO_3$ and the ß-OH value in the above preferred ranges allows achievement of the refining effect of the sulfuric acid salt and continuous glass fiber production in which filament breakage of the glass fiber substantially free of As and Sb is reduced. In a preferred embodiment of the present invention, the content of $SO_3$ is more than 0 ppm and 75 ppm or less or particularly 20 to 75 ppm, and the ß-OH value is 0.1 $mm^{-1}$ or more and less than 0.55 $mm^{-1}$ or particularly 0.3 $mm^{-1}$ or more and less than 0.55 $mm^{-1}$. In another embodiment, the present invention includes a glass fiber in which the content of $SO_3$ is more than 75 ppm and 100 ppm or less or particularly more than 75 ppm and 85 ppm or less and the ß-OH value is 0.1 $mm^{-1}$ or more and less than 0.3 $mm^{-1}$. In these embodiments, the glass fiber may be substantially free of As and Sb. In these embodiments, the glass fiber may have a diameter of 15 μm or less.

[Glass Composition]

The glass fiber according to the present invention has, for example, the following glass composition A. The glass composition may contain a component other than the following. Examples of the component other than the following includes $SO_3$.

| | |
|---|---|
| $SiO_2$ | 45 to 80% |
| $Al_2O_3$ | 0 to 40% |
| $B_2O_3$ | 0 to 30% |
| MgO | 0 to 30% |
| CaO | 0 to 30% |
| SrO | 0 to 30% |
| $Li_2O$ | 0 to 4.5% |
| $Na_2O$ | 0 to 5% |
| $K_2O$ | 0 to 5% |

A preferred example of the glass composition A is a glass composition B in which the content of $SiO_2$ is 45 to 70%, the content of $Al_2O_3$ is 15 to 40%, the total content in mass % of MgO, CaO, and SrO is 0 to 30%.

In each of the glass compositions A and B, the content of $SiO_2$ may be 50 to 80%.

Another preferred example of the glass composition A is a glass composition C in which the content of $SiO_2$ is 52 to 66%, the content of $Al_2O_3$ is 12 to 26%, the content of $B_2O_3$ is 0 to 4%, the content of MgO is 5 to 19%, the content of CaO is 0 to 16%, and the content of $Na_2O$ is 0 to 2%.

The glass composition C may be a glass composition D in which the content of $SiO_2$ is 55 to 60%, the content of MgO is 5 to 16%, and the total content in mass % of $Li_2O$, $Na_2O$, and $K_2O$ is 0 to 2%.

The glass composition C may be a glass composition E in which the content of $Al_2O_3$ is 19 to 26%, the content of $B_2O_3$ is 0 to 2%, the content of MgO is 9 to 19%, the content of CaO is 0 to 10%, the content of $Li_2O$ is 0 to 0.5%, the content of $Na_2O$ is 0 to 1.5%, and the content of $K_2O$ is 0 to 0.5%.

Another preferred example of the glass composition A is a glass composition F in which the content of $SiO_2$ is 45 to 78%, the content of $Al_2O_3$ is 0 to 18%, the content of $B_2O_3$ is 14 to 30%, the content of MgO is 0 to 6%, the content of CaO is 0 to 8%, the content of $Na_2O$ is 0 to 5% (preferably 0 to 1.5%), and the content of $K_2O$ is 0 to 1.5%. The content of $SiO_2$ may be 50 to 80% also in the glass composition F.

The glass compositions A to F may be glass compositions substantially free of a divalent metal oxide other than MgO and CaO.

[Components in Glass Composition]

($SiO_2$)

$SiO_2$ is a component that forms a glass network. The content of $SiO_2$ is set in the range of, for example, 45 to 80%. The content of $SiO_2$ is preferably 50% or more or 52% or more, more preferably 53% or more, and particularly preferably 54% or more, and may be, in some cases, 56% or more or 57% or more. The content of $SiO_2$ is preferably 73% or less, more preferably less than 70%, and particularly preferably 68% or less, and may be, in some cases, 66% or less, even 63% or less, or particularly 62% or less.

($Al_2O_3$)

$Al_2O_3$ is a component that contributes to maintenance of, for example, the heat resistance and water resistance of the glass fiber and affects, for example, the devitrification temperature and viscosity. The content of $Al_2O_3$ is set in the range of, for example, 0 to 40%. The content of $Al_2O_3$ is preferably 10% or more, more preferably 12% or more, and particularly preferably 15% or more, and may be, in some cases, 17% or more or even 19% or more. Too high a content of $Al_2O_3$ can greatly increase the liquidus temperature and cause a disadvantage for producing the glass fiber. Therefore, the content of $Al_2O_3$ is preferably 30% or less, more preferably 26% or less, and even more preferably 25% or less, and may be, in some cases, 22% or less or even 20% or less.

($B_2O_3$)

$B_2O_3$ is an optional component that forms a glass network and affects the properties such as the devitrification temperature and viscosity. The content of $B_2O_3$ is set in the range of, for example, 0 to 30%. Addition of a minor amount of $B_2O_3$ can contribute to a decrease in devitrification temperature. Therefore, $B_2O_3$ is preferably added (content: more than 0%), and the content thereof is preferably 0.1% or more and particularly preferably 0.5% or more, and may be, in some cases, 1% or more or even 1.5% or more. The content of $B_2O_3$ is preferably 2.5% or less, more preferably 2.2% or less, and particularly preferably 2% or less, and may be, in some cases, 1.8% or less or even 1.6% or less. $B_2O_3$ may be contained in an amount of, for example, about 14 to 30%.

(MgO)

MgO is a component that affects, for example, the devitrification temperature and viscosity. The content of MgO is set in the range of, for example, 0 to 30%. The content of MgO is preferably 5% or more, more preferably 9% or more, and particularly preferably 12% or more, and may be, in some cases, 15% or more. Too high a content of MgO can greatly increase the liquidus temperature. Therefore, the content of MgO may be 28% or less, even 20% or less, in some cases, 19% or less, or even 18% or less. The content of MgO may be limited to, for example, 0 to 6%.

(CaO)

CaO is an optional component that contributes to maintenance of, for example, the water resistance and affects, for example, the devitrification temperature and viscosity. The content of CaO is set in the range of, for example, 0 to 30%. Addition of an appropriate amount of CaO is preferred in view of decreasing the liquidus temperature. Therefore, CaO is desirably added (content: more than 0%), and the content thereof is preferably 0.1% or more and more preferably 0.2% or more, and may be, in some cases, 1% or more or even 3% or more. The content of CaO is preferably 16% or less and more preferably 10% or less, and may be, in some cases, 8% or less, even 5% or less, or particularly less than 1%.

(SrO)

SrO is also an optional component that affects the properties such as the liquidus temperature, devitrification temperature, and viscosity. The content of SrO is set in the range of, for example, 0 to 30%. However, too much SrO may interfere with homogenization of the glass melt. Therefore, the content of SrO is preferably set in the range of 0 to 5%. The content of SrO is suitably 3% or less, more suitably 1% or less, particularly suitably 0.5% or less, and more particularly suitably 0.1% or less.

(BaO)

BaO is also an optional component that affects the properties such as the liquidus temperature, devitrification temperature, and viscosity. BaO is a component that is environmentally-unfriendly and imposes a heavy work burden. Therefore, the glass fiber is preferably substantially free of BaO.

<Total content of MgO and CaO>

The total content of MgO and CaO is set in the range of preferably 15 to 30%, more preferably 18 to 30%, and particularly preferably 20 to 30%.

<Total content of MgO, CaO, and SrO>

The total content of MgO, CaO, and SrO is set in the range of, for example, 0 to 30% and preferably 15 to 30%.

($Li_2O$)

$Li_2O$ is a component that modifies a glass network, and is an optional component that affects the properties such as the liquidus temperature, devitrification temperature, and viscosity. The content of $Li_2O$ is set in the range of, for example, 0 to 4.5%. Addition of $Li_2O$ in this range is effective in decreasing the devitrification temperature. Therefore, $Li_2O$ is desirably added (content: more than 0%), and the content thereof is preferably 0.1% or more, more preferably 0.2% or more, and particularly preferably 0.3% or more, and may be, in some cases, 0.5% or more or even 0.7 or more. The content of $Li_2O$ is preferably 2.5% or less, more preferably 2% or less, and particularly preferably 1.8% or less, and may be, in some cases, 1.6% or less or even 1.5% or less. A preferred content of $Li_2O$ is, for example, 0.2 to 2.5% and higher than the content of $Na_2O$.

($Na_2O$)

Similarly to $Li_2O$, $Na_2O$ is an optional component that affects the properties such as the liquidus temperature, devitrification temperature, and viscosity. The content of $Na_2O$ is set in the range of, for example, 0 to 5%. The content of $Na_2O$ is preferably 0.05% or more and more preferably 0.1% or more, and may be, in some cases, 1% or more. The content of $Na_2O$ is preferably 2% or less, more preferably 1.5% or less, and particularly preferably 1.2% or less.

($K_2O$)

Similarly to $Li_2O$, $K_2O$ is also an optional component that affects the properties such as the liquidus temperature, devitrification temperature, and viscosity, and has a promoting effect on refining the glass melt. The content of $K_2O$ is set in the range of, for example, 0 to 5%. The content of $K_2O$ may be 0.05% or more or even 0.1% or more. The content of $K_2O$ is preferably 2.5% or less, more preferably 2% or less, particularly preferably 1.5% or less, and more particularly preferably 1.2% or less, and may be, in some cases, 1.0% or less, even 0.5% or less, or particularly 0.3% or less.

<Total Content of $Li_2O$, $Na_2O$, and $K_2O$>

The total content of $Li_2O$, $Na_2O$, and $K_2O$ is set in the range of preferably 0 to 5%, more preferably 0 to 3%, and particularly preferably 0 to 2%. The presence of a minor amount of $Li_2O$, $Na_2O$, and $K_2O$ has a decreasing effect on the viscosity of the glass melt. In view of this fact, the total content of $Li_2O$, $Na_2O$, and $K_2O$ may be 0.1% or more, even 0.3% or more, or particularly 0.5% or more.

(Transition Metal Oxide, Etc.)

An oxide of a transition element (in group 3 to group 11 in the periodic table), called a transition metal oxide, may also be an additional component. Examples of the transition metal oxide include $TiO_2$, $ZrO_2$, $Fe_2O_3$, $Y_2O_3$, $La_2O_3$, and $CeO_2$. ZnO which is an oxide of a group 12 element may also be an additional component. It is basically desirable that these oxides be excluded, but these oxides are sometimes inevitably introduced as impurities derived from a raw material or a production apparatus. Some of the oxides in a minor amount sometimes exhibit their effect as, for example, a refining agent when added. The total content of the oxides of the group 3 to group 12 elements is preferably 3% or less, more preferably 1% or less, and particularly preferably 0.5% or less, and may be, if necessary, limited to 0.1% or less. The content of each transition metal oxide is preferably 0.5% or less, particularly preferably 0.3% or less, and more particularly preferably 0.1% or less. When containing $CeO_2$, the glass composition has a low devitrification temperature in some cases.

The content of an oxide of a transition element having different valences in the glass composition is herein determined by assuming that the metal in the oxide has the maximum oxidation number. For example, iron oxide commonly exists as $Fe_2O_3$ or FeO in the glass composition. Thus, an iron oxide existing as FeO is assumed to be $Fe_2O_3$, and the content thereof is combined with the content of an iron oxide existing as $Fe_2O_3$ to determine the content of iron oxide (which may commonly be described as "T-$Fe_2O_3$").

(Other Components)

Examples of additional components other than the above include Cl and F. Examples of other additional components include $SnO_2$, $Ga_2O_3$, and $P_2O_5$. Each of the contents of the exemplary components from Cl to $P_2O_5$ is also preferably 0.5% or less, particularly preferably 0.3% or less, and more particularly preferably 0.1% or less. The glass composition is preferably substantially free of Cl and F. It should be noted that when containing F, the glass composition has a low devitrification temperature in some cases.

Although functioning as refining agents, As and Sb oxides such as $As_2O_5$, $Sb_2O_3$, and $Sb_2O_5$ are environmentally unfriendly. Therefore, the glass composition of the glass fiber is preferably adjusted to be substantially free of these oxides.

[Method for Producing Glass Fiber]

The glass fiber as described above can be produced preferably by a method including the steps of: making a glass melt from a glass raw material including a sulfuric acid salt; and forming a glass fiber from the glass melt. It is recommended that the sulfuric acid salt be a sulfuric acid salt of an alkali metal or an alkaline-earth metal.

The sulfuric acid salt preferably includes at least one selected from lithium sulfate, sodium sulfate, and potassium sulfate.

In the above production method, the glass melt made by melting the above glass raw material and not yet solidified may be formed into the glass fiber. This method is called a direct melt process. The above production method may be a method in which the step of making the glass melt from the above glass raw material glass includes the steps of: solidifying the glass raw material in a molten state to obtain a solidified body; and melting the solidified body to make the glass melt. Since the solidified body which is an intermediate material is called a marble, this method is known as a marble melt process.

[Embodiments of the Glass Fiber and Products Including the Glass Fiber]

One embodiment of the glass fiber according to the present invention is a long glass fiber or continuous glass fiber. The length of the long glass fiber may be 2 m or more or 5 km or more, and is suitably 300 km or less in view of weight. Another aspect of the present invention provides a rubber-reinforcing cord including a strand composed of a bundle of a plurality of the long glass fibers according to the present invention. Yet another aspect of the present invention provides a rubber product reinforced with the rubber-reinforcing cord according to the present invention. Examples of the rubber product include rubber belts, rubber tires, and rubber hoses. An exemplary rubber belt is a transmission belt. Examples of the transmission belt include synchronous transmission belts and friction transmission belts. An exemplary synchronous transmission belt is a toothed belt typified by a timing belt for automobiles. Examples of the friction transmission belt include flat belts, round belts, V belts, and V-ribbed belts. The rubber tires are typically tires of automobiles or bicycles. The rubber-reinforcing cord according to the present invention and the rubber product according to the present invention can be obtained by a known production method, except that the long glass fiber according to the present invention is used.

Yet another aspect of the present invention provides a yarn formed by twisting a plurality of strands composed of a bundle of the long glass fibers according to the present invention, and further provides a woven fabric, particularly cloth or a tape, including the yarn according to the present invention as the warp and/or weft.

One embodiment of the glass fiber according to the present invention is a short glass fiber or glass staple fiber. Yet another aspect of the present invention provides a non-woven glass fiber fabric including the short glass fiber according to the present invention. The non-woven glass fiber fabric according to the present invention can be obtained by a known production method, except that the short glass fiber according to the present invention is used.

Yet another aspect of the present invention provides a laminate including the short glass fiber according to the present invention and/or cloth and a resin material, particularly a laminate for printed circuit boards or a laminate for integrated circuits, and further provides a glass-fiber-reinforced thermosetting plastics (GFRP) including the glass fiber according to the present invention and a glass-fiberreinforced thermoplastic plastics (GFRTP) including the glass fiber according to the present invention.

EXAMPLES

Hereinafter, the present invention will be described more specifically with reference to examples.

Glass raw materials were prepared so that each of glass fibers to be obtained would have one of the glass compositions shown in Table 1. The glass raw materials were each molten in a glass melting furnace. A bushing attached to the bottom of the furnace was used to continuously produce a glass fiber. At the time of the production, the above techniques i) to iii) were appropriately applied or not applied to change the ß-OH values that glass fibers to be obtained would have. Sodium sulfate (salt cake) was used as a portion of each glass raw material. Glass fibers obtained had a diameter of 10 to 12 μm.

For each glass fiber type, fiber formation was performed for 20 minutes. Glass fibers not having suffered filament breakage in the formation are rated as "good" while glass fibers having suffered filament breakage in the formation are rated as "poor". Additionally, to measure the filament breakage frequency, fiber formation was performed 10 times for each glass fiber type at, in consideration of actual production, a high formation rate (which is a rate of winding the glass fiber) of about 500 m/min. The formation rate was adjusted mostly to 500 m/min so that the diameter of the resulting glass fibers would be in the above value range. In this measurement, the case where such fiber formation was successfully performed for 10 minutes or more without filament breakage is counted as a success. The filament breakage frequency represented by 9 or more successes was rated as A, that represented by 7 or 8 successes was rated as B, that represented by 4 to 6 successes was rated as C, that represented by 1 to 3 successes was rated as D, and that represented by 0 successes was rated as E. The temperature (formation temperature) of each glass melt supplied for the fiber formations was adjusted to around a temperature at which the viscosity of the glass melt would be as shown in Table 1.

The ß-OH value was measured in the following manner. Each glass melt collected from a flow path near the bushing of the glass melting furnace was solidified and slowly cooled to obtain a glass lump. A glass sheet having a thickness (t) of 1 mm was cut out from the glass lump. A transmittance T1(%) at a reference wavelength 3846 $cm^{-1}$ and a minimum transmittance T2(%) at around the OH group absorption wavelength 3600 $cm^{-1}$ were measured for the glass sheet by FT-IR. Values of T (1 mm), T1, and T2 were substituted into the following formula to obtain a value (unit: $mm^{-1}$) of ß-OH: $(1/t)\log(T1/T2)$.

The content of $SO_3$ was measured in the same manner as in Patent Literature 2. That is, 1 g of a powdered specimen was weighed into a platinum crucible and mixed with 2 g of $Na_2CO_3$. The mixture was covered by 1 g of $Na_2CO_3$, followed by alkali fusion in an electric furnace set at 950° C. for 20 minutes. Afterward, the content of the platinum crucible was taken out using warm water (ultrapure water), followed by digestion at 80° C. After that, filtration was performed using a 5C filter paper, and the filtrate was adjusted in volume to 100 ml. 20 ml of the liquid was measured out, stirred in 30 ml of an ion exchange resin for 10 minutes. The mixture was filtered using a 5A filter paper, and the filtrate was adjusted in volume to 100 ml. Measurement was performed using an ion chromatograph to identify the content of the $SO_3$ component.

The results of the above measurements are collectively shown in Tables 1 and 2. For the obtained glass fibers, the variation in diameter was determined according to the above definition. All of the values obtained in each Example were ±1.5 μm or less. "<20" indicating the content of $SO_3$ refers to more than 0 ppm and less than 20 ppm.

TABLE 1

| | Example | | | | | | | | | |
|---|---|---|---|---|---|---|---|---|---|---|
| | 1 | 2 | 3 | 4 | 5 | 6 | 7 | 8 | 9 | 10 |
| $SiO_2$ | 75.51 | 53.20 | 57.29 | 57.29 | 57.29 | 57.81 | 58.40 | 61.34 | 53.86 | 61.34 |
| $Al_2O_3$ | 0.30 | 1490 | 21.13 | 21.13 | 21.14 | 21.32 | 22.00 | 19.74 | 24.93 | 19.74 |
| $B_2O_3$ | 18.76 | 24.50 | 1.16 | 1.16 | 1.15 | 1.17 | 1.50 | 1.76 | 0 | 1.76 |
| MgO | 0.30 | 1.51 | 16.04 | 16.04 | 16.04 | 18.88 | 9.50 | 15.61 | 16.42 | 15.61 |
| CaO | 0.59 | 5.38 | 3.72 | 3.72 | 3.72 | 0.15 | 8.50 | 0.12 | 4.57 | 0.12 |
| SrO | 0 | 0 | 0 | 0 | 0 | 0 | 0 | 0 | 0 | 0 |
| $Li_2O$ | 0.494 | 0 | 0.50 | 0.50 | 0.50 | 0.50 | 0 | 0 | 0 | 0 |
| $Na_2O$ | 2.97 | 0.51 | 0.103 | 0.103 | 0.12 | 0.10 | 0.10 | 1.091 | 0.078 | 1.091 |
| $K_2O$ | 1.09 | 0 | 0 | 0 | 0 | 0 | 0 | 0.10 | 0.01 | 0.10 |
| $TiO_2$ | 0 | 0 | 0.01 | 0.01 | 0 | 0 | 0 | 0.01 | 0.02 | 0.01 |
| $T-Fe_2O_3$ | 0 | 0 | 0.05 | 0.05 | 0.04 | 0.05 | 0.10 | 0.21 | 0.13 | 0.21 |
| $CeO_2$ | 0 | 0 | 0 | 0 | 0 | 0 | 0.30 | 0 | 0 | 0 |
| $F_2$ | 0 | 0 | 0 | 0 | 0 | 0 | 0 | 0 | 0 | 0 |
| $SO_3$ (ppm) | <20 | <20 | 30 | 50 | <20 | <20 | 28 | 60 | 38 | 47 |
| β-OH ($mm^{-1}$) | 0.34 | 0.36 | 0.37 | 0.44 | 0.37 | 0.12 | 0.4 | 0.45 | 0.38 | 0.42 |
| Temperature (° C.) | 1510 | 1380 | 1380 | 1380 | 1380 | 1380 | 1330 | 1420 | 1260 | 1420 |
| Viscosity (log η) | 2.5 | 2.5 | 2.5 | 2.5 | 2.5 | 2.5 | 2.7 | 2.5 | 3 | 2.5 |
| Filament breakage | Good | Good | Good | Good | Good | Good | Good | Good | Good | Good |
| Filament breakage frequency | A | A | — | A | A | C | A | A | A | A |

TABLE 1-continued

| | Example | | | | | | | | | |
|---|---|---|---|---|---|---|---|---|---|---|
| | 11 | 12 | 13 | 14 | 15 | 16 | 17 | 18 | 19 | 20 |
| $SiO_2$ | 61.34 | 57.81 | 58.40 | 61.34 | 52.60 | 78.10 | 74.54 | 52.80 | 53.50 | 54.20 |
| $Al_2O_3$ | 19.74 | 21.32 | 22.00 | 19.74 | 12.10 | 0.30 | 0.99 | 14.70 | 15.00 | 13.50 |
| $B_2O_3$ | 1.76 | 1.17 | 1.50 | 1.76 | 25.30 | 18.10 | 19.88 | 24.00 | 25.20 | 22.00 |
| MgO | 15.61 | 18.88 | 9.50 | 15.61 | 0 | 0.30 | 0 | 0 | 1.50 | 2.50 |
| CaO | 0.12 | 0.15 | 8.50 | 0.12 | 5.51 | 0.62 | 0.99 | 5.30 | 1.50 | 6.50 |
| SrO | 0 | 0 | 0 | 0 | 0 | 0 | 0 | 0 | 0 | 0 |
| $Li_2O$ | 0 | 0.501 | 0 | 0 | 0 | 0 | 0 | 0 | 0.10 | 0.15 |
| $Na_2O$ | 1.091 | 0.10 | 0.10 | 1.09 | 4.56 | 1.57 | 3.59 | 3.30 | 0.10 | 0.15 |
| $K_2O$ | 0.10 | 0 | 0 | 0.10 | 0 | 1.02 | 0 | 0 | 0.10 | 0 |
| $TiO_2$ | 0.01 | 0 | 0 | 0 | 0 | 0 | 0 | 0 | 3.00 | 1.00 |
| $T-Fe_2O_3$ | 0.21 | 0.05 | 0.10 | 0.21 | 0 | 0 | 0 | 0 | 0 | 0 |
| $CeO_2$ | 0 | 0 | 0.30 | 0 | 0 | 0 | 0 | 0 | 0 | 0 |
| $F_2$ | 0 | 0 | 0 | 0 | 0 | 0 | 0 | 0 | 0 | 0.50 |
| $SO_3$ (ppm) | 26 | 84 | 78 | 82 | 81 | <20 | <20 | <20 | <20 | <20 |
| β-OH ($mm^{-1}$) | 0.45 | 0.12 | 0.12 | 0.18 | 0.16 | 0.28 | 0.3 | 0.4 | 0.25 | 0.31 |
| Temperature (° C.) | 1420 | 1320 | 1280 | 1340 | 1320 | 1500 | 1470 | 1330 | 1345 | 1310 |
| Viscosity (log η) | 2.5 | 3.2 | 3.2 | 3.2 | 3.2 | 2.5 | 2.5 | 3 | 3 | 3 |
| Filament breakage | Good | Good | Good | Good | Good | Good | Good | Good | Good | Good |
| Filament breakage frequency | A | B | C | C | B | B | A | A | B | A |

* "Temperature" indicates the formation temperature, and "viscosity" indicates the viscosity of each glass at the formation temperature.

TABLE 2

| | Example | | | | | | | | | | |
|---|---|---|---|---|---|---|---|---|---|---|---|
| | 21 | 22 | 23 | 24 | 25 | 26 | 27 | 28 | 29 | 30 | 31 |
| $SiO_2$ | 56.10 | 57.00 | 56.00 | 61.20 | 50.65 | 53.12 | 71.52 | 64.65 | 67.83 | 49.15 | 48.78 |
| $Al_2O_3$ | 12.00 | 15.00 | 13.00 | 23.00 | 35.16 | 18.13 | 20.25 | 27.43 | 20.55 | 31.07 | 16.44 |
| $B_2O_3$ | 26.00 | 18.00 | 25.00 | 4.00 | 0 | 0 | 0 | 0 | 0 | 0 | 27.88 |
| MgO | 0 | 3.50 | 0 | 10.60 | 8.20 | 23.45 | 8.95 | 5.10 | 8.20 | 14.80 | 1.49 |
| CaO | 5.90 | 3.50 | 6.00 | 1.00 | 5.99 | 5.30 | 0.15 | 2.82 | 3.42 | 4.98 | 4.98 |
| SrO | 0 | 0 | 0 | 0 | 0 | 0 | 0 | 0 | 0 | 0 | 0 |
| $Li_2O$ | 0 | 0 | 0 | 0 | 0 | 0 | 0 | 0 | 0 | 0 | 0 |
| $Na_2O$ | 0 | 0 | 0.10 | 0.20 | 0 | 0 | 0 | 0.01 | 0.01 | 0 | 0.43 |
| $K_2O$ | 0 | 0 | 0 | 0 | 0 | 0 | 0 | 0 | 0 | 0 | 0 |
| $TiO_2$ | 0 | 0 | 0 | 0 | 0 | 0 | 0 | 0 | 0 | 0 | 0 |
| $T-Fe_2O_3$ | 0 | 0 | 0 | 0 | 0 | 0 | 0 | 0 | 0 | 0 | 0 |
| $CeO_2$ | 0 | 0 | 0 | 0 | 0 | 0 | 0 | 0 | 0 | 0 | 0 |
| $F_2$ | 1.82 | 0 | 0 | 0 | 0 | 0 | 0 | 0 | 0 | 0 | 0 |
| $SO_3$ (ppm) | <20 | <20 | <20 | <20 | <20 | 32 | <20 | <20 | <20 | <20 | <20 |
| β-OH ($mm^{-1}$) | 0.34 | 0.4 | 0.41 | 0.21 | 0.4 | 0.38 | 0.39 | 0.36 | 0.25 | 0.37 | 0.45 |
| Temperature (° C.) | 1340 | 1310 | 1345 | 1390 | 1340 | 1240 | 1440 | 1409 | 1410 | 1310 | 1335 |
| Viscosity (log η) | 3 | 3 | 3 | 3 | 3 | 3 | 3 | 3 | 3 | 3 | 3 |
| Filament breakage | Good | Good | Good | Good | Good | Good | Good | Good | Good | Good | Good |
| Filament breakage frequency | A | A | A | B | A | A | A | A | B | A | A |

| | Example | | | | Comparative Example | | | | |
|---|---|---|---|---|---|---|---|---|---|
| | 32 | 33 | 34 | 35 | 1 | 2 | 3 | 4 | 5 |
| $SiO_2$ | 57.29 | 57.29 | 60.58 | 73.90 | 57.29 | 58.40 | 57.81 | 61.34 | 50.86 |
| $Al_2O_3$ | 21.13 | 21.13 | 19.15 | 0.99 | 21.13 | 22.00 | 21.32 | 19.74 | 14.05 |
| $B_2O_3$ | 1.16 | 1.16 | 1.72 | 19.71 | 1.16 | 1.50 | 1.17 | 1.76 | 27.13 |
| MgO | 16.04 | 16.04 | 10.40 | 0 | 16.04 | 9.50 | 18.88 | 15.61 | 0 |
| CaO | 3.72 | 3.72 | 6.81 | 0.99 | 3.72 | 8.50 | 0.15 | 0.12 | 4.84 |
| SrO | 0 | 0 | 0 | 0 | 0 | 0 | 0 | 0 | 0 |
| $Li_2O$ | 0.50 | 0.50 | 0 | 0 | 0.50 | 0 | 0.50 | 0 | 0 |
| $Na_2O$ | 0.103 | 0.103 | 1.044 | 4.42 | 0.103 | 0.10 | 0.10 | 1.091 | 3.12 |
| $K_2O$ | 0 | 0 | 0.11 | 0 | 0 | 0 | 0 | 0.10 | 0 |
| $TiO_2$ | 0.01 | 0.01 | 0 | 0 | 0.01 | 0 | 0 | 0.01 | 0 |

TABLE 2-continued

| | | | | | | | | | |
|---|---|---|---|---|---|---|---|---|---|
| T-Fe$_2$O$_3$ | 0.05 | 0.05 | 0.18 | 0 | 0.05 | 0.10 | 0.05 | 0.21 | 0 |
| CeO$_2$ | 0 | 0 | 0 | 0 | 0 | 0.30 | 0 | 0 | 0 |
| F$_2$ | 0 | 0 | 0 | 0 | 0 | 0 | 0 | 0 | 0 |
| SO$_3$ (ppm) | 88 | 97 | 100 | 140 | 60 | 83 | 72 | 50 | <20 |
| β-OH (mm$^{-1}$) | 0.47 | 0.41 | 0.35 | 0.32 | 0.6 | 0.61 | 0.58 | 0.68 | 0.59 |
| Temperature (° C.) | 1340 | 1340 | 1385 | 1440 | 1340 | 1330 | 1380 | 1420 | 1330 |
| Viscosity (log η) | 2.5 | 2.5 | 2.7 | 2.5 | 2.5 | 2.7 | 2.5 | 2.6 | 3 |
| Filament breakage | Poor | Poor | Poor | Poor | Poor | Poor | Poor | Poor | Poor |
| Filament breakage frequency | D | D | D | D | E | E | E | E | E |

The invention claimed is:

1. A glass fiber having a β-OH value of 0.02 mm$^{-1}$ or more and less than 0.55 mm$^{-1}$, comprising, in mass %:

| | |
|---|---|
| SiO$_2$ | 45 to 80%; |
| Al$_2$O$_3$ | 0 to 40%; |
| B$_2$O$_3$ | 0 to 30%; |
| MgO | 0 to 30%; |
| CaO | 0 to 30%; |
| SrO | 0 to 30%; |
| Li$_2$O | 0 to 4.5%; |
| Na$_2$O | 0 to 5%; and |
| K$_2$O | 0 to 5%. | wherein, in mass %, the content of SiO$_2$ is 45 to 73% and/or the content of Al$_2$O$_3$ is 10 to 40%.

2. The glass fiber according to claim 1, wherein, in mass %, the content of SiO$_2$ is 50 to 73%.

3. The glass fiber according to claim 1, wherein, in mass %, the content of SiO$_2$ is 45 to 70%, the content of Al$_2$O$_3$ is 15 to 40%, and the total content in mass % of MgO, CaO, and SrO is 0 to 30%.

4. The glass fiber according to claim 3, wherein, in mass %, the content of SiO$_2$ is 50 to 70%.

5. The glass fiber according to claim 4, wherein, in mass %, the content of SiO$_2$ is 52 to 66%, the content of Al$_2$O$_3$ is 12 to 26%, the content of B$_2$O$_3$ is 0 to 4%, the content of MgO is 5 to 19%, the content of CaO is 0 to 16%, and the content of Na$_2$O is 0 to 2%.

6. The glass fiber according to claim 5, wherein, in mass %, the content of SiO$_2$ is 55 to 60%, the content of MgO is 5 to 16%, and the total content in mass % of Li$_2$O, Na$_2$O, and K$_2$O is 0 to 2%.

7. The glass fiber according to claim 5, wherein, in mass %, the content of Al$_2$O$_3$ is 19 to 26%, the content of B$_2$O$_3$ is 0 to 2%, the content of MgO is 9 to 19%, the content of CaO is 0 to 10%, the content of Li$_2$O is 0 to 0.5%, the content of Na$_2$O is 0 to 1.5%, and the content of K$_2$O is 0 to 0.5%.

8. The glass fiber according to claim 1, wherein, in mass %, the content of SiO$_2$ is 45 to 73%, the content of Al$_2$O$_3$ is 0 to 18%, the content of B$_2$O$_3$ is 14 to 30%, the content of MgO is 0 to 6%, the content of CaO is 0 to 8%, the content of Na$_2$O is 0 to 5%, and the content of K$_2$O is 0 to 1.5%.

9. The glass fiber according to claim 8, wherein, in mass %, the content of SiO$_2$ is 50 to 73%.

10. The glass fiber according to claim 1, wherein the glass fiber is substantially free of a divalent metal oxide other than MgO and CaO.

11. The glass fiber according to claim 1, wherein the glass fiber has a diameter of 15 μm or less.

12. The glass fiber according to claim 11, wherein the glass fiber is substantially free of As and Sb, and the content of SO$_3$ is more than 0 ppm and 75 ppm or less on a mass basis.

13. The glass fiber according to claim 12, wherein the glass fiber has a β-OH value of 0.3 mm$^{-1}$ or more and less than 0.55 mm$^{-1}$, and the content of SO$_3$ is 20 to 75 ppm on a mass basis.

14. The glass fiber according to claim 1, wherein the glass fiber has a diameter of 10 μm or less.

15. The glass fiber according to claim 1, wherein a variation in diameter is 3 μm or less.

16. The glass fiber according to claim 1, being a long glass fiber.

17. A rubber-reinforcing cord comprising a strand composed of a bundle of a plurality of the long glass fibers according to claim 16.

18. A rubber product reinforced with the rubber-reinforcing cord according to claim 17.

19. The glass fiber according to claim 1, being a short glass fiber.

20. A non-woven glass fiber fabric comprising the short glass fiber according to claim 19.

21. A method for producing the glass fiber according to claim 1, comprising:
making a glass melt from a glass raw material comprising a sulfuric acid salt; and
forming a glass fiber from the glass melt, wherein the sulfuric acid salt comprises a sulfuric acid salt of an alkali metal or an alkaline-earth metal.

22. A glass fiber having a β-OH value of 0.02 mm$^{-1}$ or more and less than 0.55 mm$^{-1}$, wherein
the glass fiber is substantially free of As and Sb, and
the content of SO$_3$ is more than 0 ppm and 75 ppm or less on a mass basis.

23. The glass fiber according to claim 22, wherein the glass fiber has a β-OH value of 0.3 mm 1 or more and less than 0.55 mm$^{-1}$, and
the content of SO$_3$ is 20 to 75 ppm on a mass basis.

24. A rubber-reinforcing cord comprising a strand composed of a bundle of a plurality of the glass fibers according to claim 22.

25. A rubber product reinforced with the rubber-reinforcing cord according to claim 24.

26. A non-woven glass fiber fabric comprising the glass fiber according to claim 22.

27. A glass fiber having a β-OH value of 0.35 mm$^{-1}$ to 0.53 mm$^{-1}$, wherein
the content of SO$_3$ is 20 ppm to 70 ppm on a mass basis.

28. A rubber-reinforcing cord comprising a strand composed of a bundle of a plurality of the glass fibers according to claim 27.

29. A rubber product reinforced with the rubber-reinforcing cord according to claim 28.

30. A non-woven glass fiber fabric comprising the glass fiber according to claim 27.

* * * * *